US011786967B2

(12) United States Patent
Ogata et al.

(10) Patent No.: US 11,786,967 B2
(45) Date of Patent: Oct. 17, 2023

(54) COMPOSITE MEMBER MANUFACTURING METHOD AND COMPOSITE MEMBER

(71) Applicant: Proterial, Ltd., Tokyo (JP)

(72) Inventors: Makoto Ogata, Tokyo (JP); Shuho Koseki, Tokyo (JP); Tadashi Furuya, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 688 days.

(21) Appl. No.: 16/099,868

(22) PCT Filed: May 1, 2017

(86) PCT No.: PCT/JP2017/017176
§ 371 (c)(1),
(2) Date: Nov. 8, 2018

(87) PCT Pub. No.: WO2017/195695
PCT Pub. Date: Nov. 16, 2017

(65) Prior Publication Data
US 2019/0111520 A1    Apr. 18, 2019

(30) Foreign Application Priority Data
May 11, 2016  (JP) ................................. 2016-095551

(51) Int. Cl.
*B22F 3/24* (2006.01)
*C22C 19/07* (2006.01)
(Continued)

(52) U.S. Cl.
CPC ................ *B22F 3/24* (2013.01); *B22F 3/105* (2013.01); *B22F 3/16* (2013.01); *B22F 10/28* (2021.01);
(Continued)

(58) Field of Classification Search
CPC .................. B22F 2998/10; B22F 10/20; B22F 2003/248; B22F 3/105; B22F 3/1055;
(Continued)

(56) References Cited
U.S. PATENT DOCUMENTS

| 6,429,402 B1* | 8/2002 | Dixon .................... B23K 26/34 219/121.63 |
| 2010/0101368 A1* | 4/2010 | Fang ........................ C22C 29/08 75/240 |

(Continued)

FOREIGN PATENT DOCUMENTS

| CN | 103173760 A | 6/2013 |
| CN | 105112708 A | 12/2015 |

(Continued)

OTHER PUBLICATIONS

Extended European Search Report dated Dec. 10, 2019 for the European Patent Application No. 17796056.4.
(Continued)

*Primary Examiner* — Dana Ross
*Assistant Examiner* — Joe E Mills, Jr.
(74) *Attorney, Agent, or Firm* — Volpe Koenig

(57) ABSTRACT

An object of the present invention is to provide an additively manufactured part with high temperature strength and high ductility that can be suitably used for hot forging even in the temperature range of 800° C. or more, and a manufacturing method therefor. The manufacturing method for the additively manufactured part in accordance with the present invention includes an additive manufacturing step of using composite powder containing ceramic and metal and having voids therein to form a composite material containing the ceramic and the metal by repeating steps of melting and solidifying the composite powder; and a remelting step of remelting the surface of the composite material.

9 Claims, 11 Drawing Sheets

(51) Int. Cl.
| | |
|---|---|
| *B22F 3/105* | (2006.01) |
| *B22F 3/16* | (2006.01) |
| *B29C 64/141* | (2017.01) |
| *B33Y 70/10* | (2020.01) |
| *B22F 10/28* | (2021.01) |
| *B22F 10/364* | (2021.01) |
| *B22F 10/64* | (2021.01) |
| *B33Y 10/00* | (2015.01) |
| *B23K 26/342* | (2014.01) |
| *B23K 26/00* | (2014.01) |
| *B22F 10/66* | (2021.01) |
| *B23K 103/00* | (2006.01) |
| *B23K 103/08* | (2006.01) |

(52) U.S. Cl.
CPC .......... *B22F 10/364* (2021.01); *B22F 10/64* (2021.01); *B23K 26/0006* (2013.01); *B23K 26/342* (2015.10); *B29C 64/141* (2017.08); *B33Y 10/00* (2014.12); *B33Y 70/10* (2020.01); *C22C 19/07* (2013.01); *B22F 10/66* (2021.01); *B23K 2103/08* (2018.08); *B23K 2103/52* (2018.08); *Y02P 10/25* (2015.11)

(58) Field of Classification Search
CPC ... B22F 3/16; B22F 3/24; B33Y 10/00; B33Y 70/00; B33Y 80/00; B23K 2103/08; B23K 2103/52; B23K 26/0006; B23K 26/342; B29C 64/141; C22C 19/07; C22C 29/08; Y02P 10/25; Y02P 10/295
See application file for complete search history.

(56) References Cited

U.S. PATENT DOCUMENTS

| | | |
|---|---|---|
| 2012/0040157 A1 | 2/2012 | Konyashin et al. |
| 2015/0060042 A1 | 3/2015 | Shilpiekandula et al. |
| 2015/0247219 A1* | 9/2015 | Berglund .................. C22C 1/05 75/240 |
| 2017/0189960 A1* | 7/2017 | Ibe ........................ B22F 1/0014 |
| 2017/0256385 A1* | 9/2017 | Paskalova .............. B33Y 30/00 |

FOREIGN PATENT DOCUMENTS

| | | |
|---|---|---|
| EP | 2947184 A1 | 11/2015 |
| EP | 3187285 A1 | 7/2017 |
| JP | 62-004804 A | 1/1987 |
| JP | 62-260027 A | 11/1987 |
| JP | 63-045345 A | 2/1988 |
| JP | 2003-245981 A | 9/2003 |
| JP | 2003-268479 A | 9/2003 |
| WO | 2010/103418 A1 | 9/2010 |
| WO | 2015/194678 A1 | 12/2015 |
| WO | 2016/031279 A1 | 3/2016 |

OTHER PUBLICATIONS

Yasa et al., "Manufacturing by combining Selective Laser Melting and Selective Laser Erosion/laser re-melting," CIRP Annals—Manufacturing Technology, vol. 60, Issue 1, 2011, pp. 263-266 (2011).
International Search Report for PCT/JP2017/017176, dated Aug. 1, 2017.
Japanese Office Action dated May 26, 2020 for the Japanese Patent Application No. 2018-516979.
Baojun et al., "Powder Injection Moulding of WC-8%Co Hard Metals," Rare Metal Materials and Engineering. vol. 31, No. 4, pp. 303-307 (Aug. 31, 2002).
Singaporean Office Action dated Oct. 3, 2019 for the Singaporean Patent Application No. 11201809957W.
Chinese Office Action dated Mar. 27, 2020 for the Chinese Patent Application No. 201780028026.9.

\* cited by examiner

COMPOSITE MEMBER MANUFACTURING METHOD AND COMPOSITE MEMBER

TECHNICAL FIELD

The present invention relates to a composite material manufacturing method and a composite material.

BACKGROUND ART

As a material for warm/hot forging dies, tool steel is commonly used. In recent years, to increase the demand of near net shapability, the materials for dies has been required to provide higher strength and ductility than those in the past, and therefore, the conventional tool steel has been improved to be applied as the material. For example, SKD 61 steel containing iron (Fe) as a main component has been allowed to have higher strength by causing a martensitic phase and precipitants to appear during heat treatment for quenching and tempering. In this manner, tool steel has been currently improved to have higher strength and ductility than those of the conventional tool steel through improvements to the elements added thereto and the heat treatment process.

However, in order to improve the productivity while further improving the near net shapability, forging is required to be performed at a process temperature of around 1000° C., which is problematic in that tool steel containing Fe as a main component would soften at a temperature of greater than or equal to 800° C., and thus, a sufficient operational life of the die cannot be obtained.

Meanwhile, as an alloy with higher strength than that of tool steel at a high temperature of 800° C. or more, for example, there is known a composite alloy typified by cemented carbide that has two phases including WC as ceramic particles and Co as metal to bind these particles, which is widely used for cutting tools, in particular (Patent Literature 1).

However, a composite alloy such as cemented carbide has lower ductility than that of tool steel and thus is difficult to be applied to dies. Further, regarding a sintering process that is widely applied to cemented carbide for cutting tools, it is considered that the amount of areas of the die that should be cut away in a post process would be large due to thermal deformation of the die that occurs during the sintering. For this reason, composite alloys are considered to be difficult to be applied to dies from the process perspective.

Herein, it is known that with an additive manufacturing method for forming an additively manufactured part with a three-dimensional shape by locally melting and solidifying powder using a heat source and thus repeatedly forming solidified layers in a stacked manner as in Patent Literature 2, it is possible to form a structure into any given shape without large deformation generated therein.

CITATION LIST

Patent Literature

Patent Literature 1: JP S62-260027 A
Patent Literature 2: JP 2003-245981 A

SUMMARY OF INVENTION

Technical Problem

Composite powder containing ceramic and metal has high temperature strength, and thus, it is considered to be suitable as a material for a warm/hot forging die that is formed using the aforementioned additive manufacturing. However, it is concerned that such composite powder will inevitably have voids generated in and outside the powder during a granulation process, and such voids in the powder can become a cause for voids generated in the resulting additively manufactured composite material, which in turn can cause a decrease in the strength of the composite material.

Therefore, an object of the present invention is to provide a method for manufacturing a composite material with high temperature strength and the composite material in which even when additive manufacturing is performed using composite powder containing ceramic and metal and having voids therein, the resulting composite material has few voids therein.

Solution to Problem

An aspect of the present invention is a composite material manufacturing method including an additive manufacturing step of using composite powder containing ceramic and metal and having voids therein to form a composite material containing the ceramic and the metal by repeating steps of melting and solidifying the composite powder; and a remelting step of remelting the surface of the composite material. Preferably, the method further includes a heat treatment step of applying heat treatment in the temperature range of 800 to 1400° C. after the remelting step. Preferably, the ceramic is tungsten carbide, and the metal is cobalt.

Another aspect of the present invention is a composite material including a ceramic phase and a metallic phase, in which the porosity of a region of the composite material in the thickness range of at least 100 μm from the surface of the composite material is less than or equal to 10%. Preferably, the mass fraction of an η phase included in the composite material is less than or equal to 10%. Preferably, the ceramic phase is tungsten carbide, and the metallic phase is cobalt.

Advantageous Effects of Invention

According to the present invention, a composite material containing ceramic and metal and having few voids therein and thus having high temperature strength can be provided, the composite material having been formed by using composite powder containing ceramic and metal and having voids therein and repeatedly performing melting and solidifying steps thereon.

DESCRIPTION OF EMBODIMENTS

Figure 5:
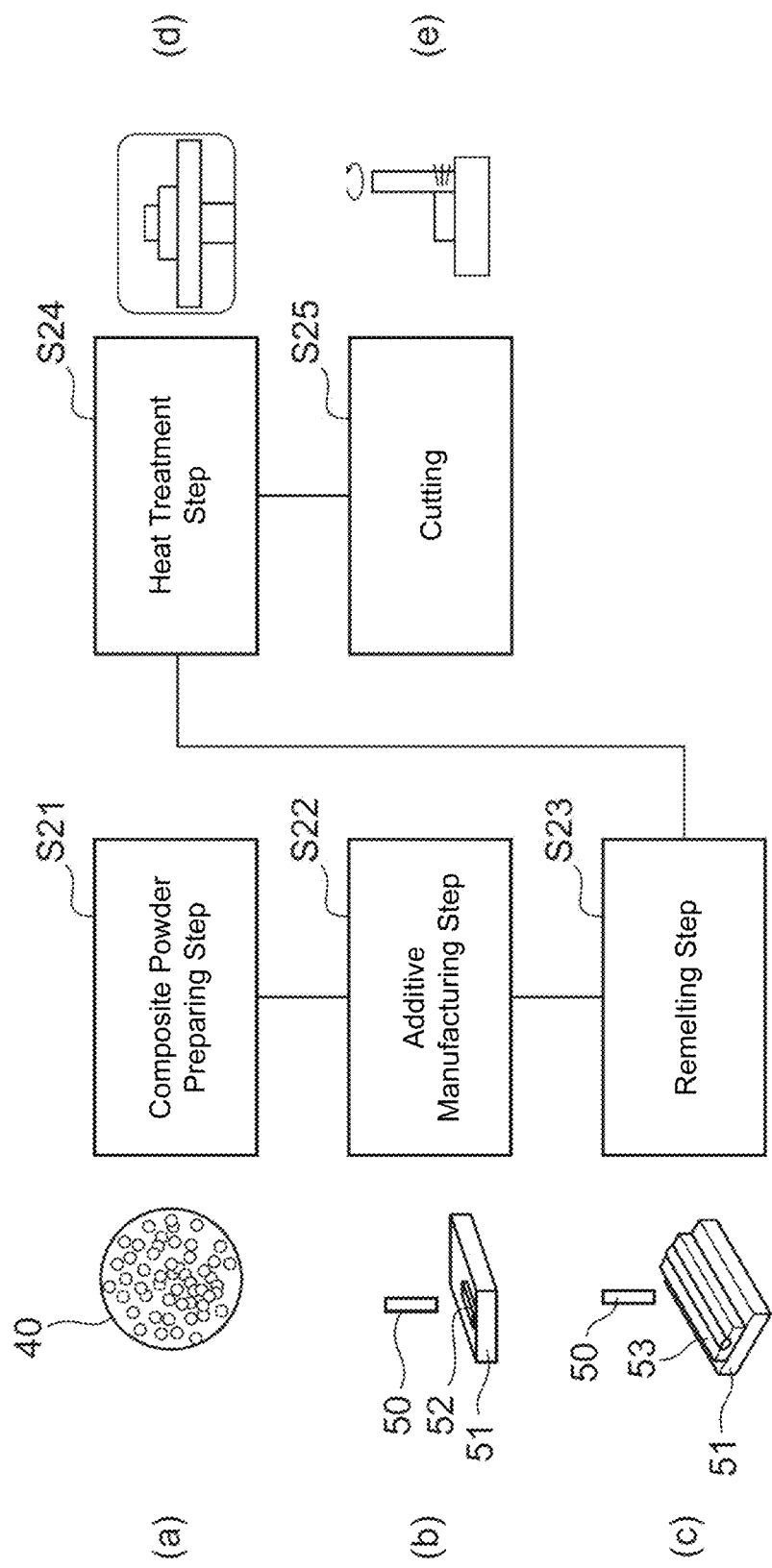
FIG. 5 is a process chart showing an example of a method for manufacturing a part using the composite powder in accordance with the present invention.

Hereinafter, embodiments of the present invention will be specifically described with reference to the accompanying drawings. It should be noted that the present invention is not limited to the embodiments described below, and can be combined or modified as appropriate within the spirit and scope of the invention. FIG. 5 shows an example of a method for manufacturing a composite material of the present invention. In the manufacturing method of the present invention, composite powder is prepared (S21), and additive manufacturing is performed by melting and solidifying the composite powder (S22), and then, the surface of the obtained composite material is remelted (S23), whereby a composite material is manufactured. In the manufacturing method of the present invention, in order to further improve the strength and shape accuracy, heat treatment may be performed on the composite material after the remelting step (S24) or cutting work may be performed on the composite material (S25). Hereinafter, the aforementioned "composite material" shall also be referred to as an "additively manufactured part."

<Step of Preparing Composite Powder (S21)>

Figure 1:
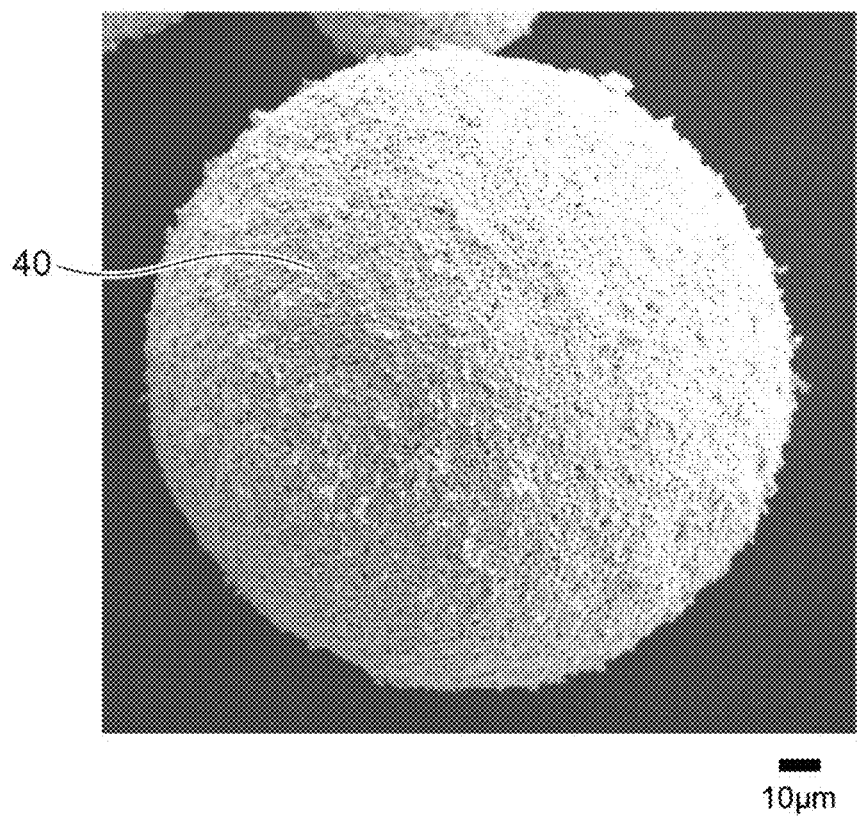
FIG. 1 is a photograph showing the appearance of composite powder in accordance with the present invention.
Figure 2:
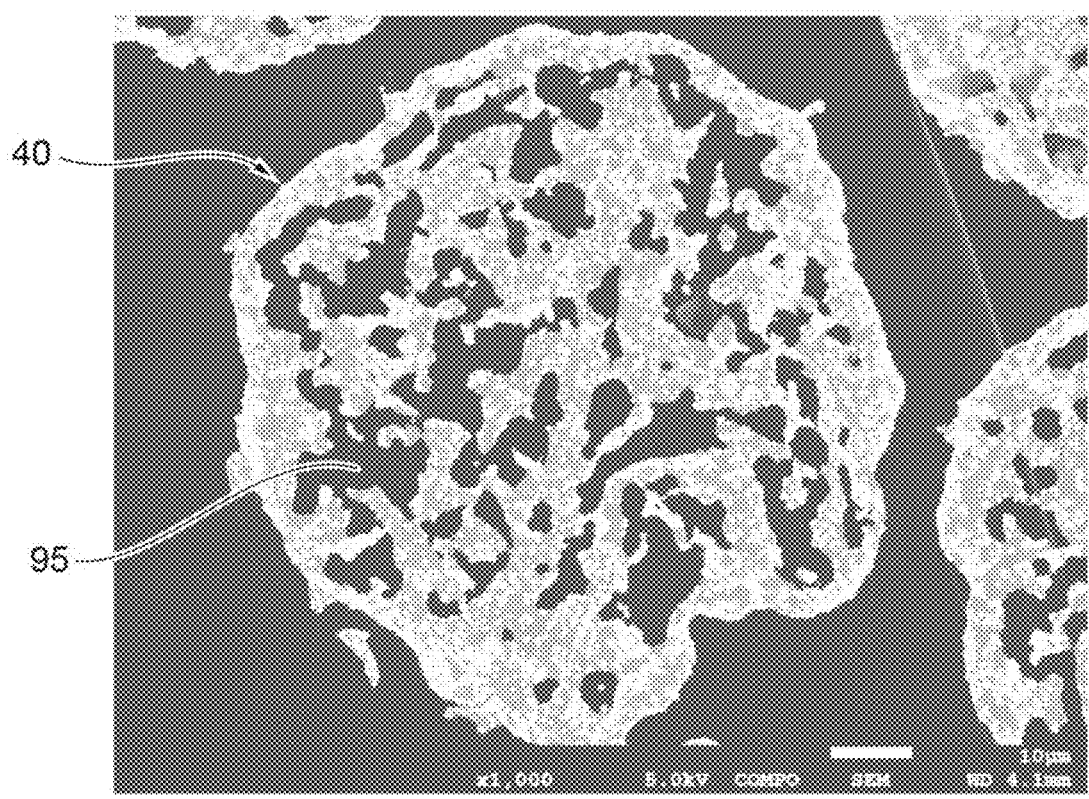
FIG. 2 is a photograph showing the cross-sectional structure of the composite powder in accordance with the present invention.

First, composite powder in accordance with the present invention will be described. FIG. 1 is a SEM photograph showing the appearance of composite powder in accordance with the present invention. FIG. 2 is a SEM photograph showing an example of the cross-sectional structure of the composite powder in accordance with the present invention. The composite powder in accordance with the present invention is composite powder containing ceramic and metal. The volume ratio between ceramic and metal can be, for example, 40 to 90% by volume of ceramic and 10 to 60% by volume of metal (the total volume of ceramic and metal equals 100%). It should be noted that in order to obtain powder with higher rigidity and higher ductility, the upper limit of the volume of ceramic in the composite powder in accordance with the present invention is preferably set to 70%, and the lower limit of the volume of metal therein is preferably set to 30%. The volume ratio between ceramic and metal can be measured using the following method, for example. First, the composition of ceramic and metal forming the composite powder is identified using an energy dispersive X-ray spectroscopy (EDS) commonly equipped with on a scanning electron microscope (SEM) and using another composition analysis method. Then, powder of ceramic and powder of metal for which the composition has been identified are prepared and mixed while their volume ratio is changed (for example, in increments/decrements of 10%) so as to form a plurality of types of composite powder for reference samples, and then, the results of powder X-ray diffraction performed thereon are obtained. From the results of the X-ray diffraction obtained from each powder, the total value of the peak top values of the three strongest lines is determined and plotted to create a calibration curve. Using the calibration curve can determine an unknown volume ratio. In addition, the mixing ratio of ceramic powder and metal powder in forming the composite powder is preferably set to the aforementioned volume ratio.

Ceramic contained in the composite powder in accordance with the present invention is preferably selected from carbide, nitride, carbonitride, oxide, or boride of at least one of W (tungsten), Cr (chromium), Mo (molybdenum), V (vanadium), Zr (zirconium), Al (aluminum), Si (silicon), Nb (niobium), Ta (tantalum), or Ti (titanium).

In addition, metal contained in the composite powder in accordance with the present invention is preferably at least one element selected from Co (cobalt), Ni (nickel), Fe (iron), W (tungsten), or Mo (molybdenum). It should be noted that in this embodiment, WC—Co composite powder in which tungsten carbide (WC) is used as the ceramic and cobalt (Co) is used as the metal is selected unless otherwise specifically described.

The composite powder in accordance with the present invention has voids 95 therein (some of which are exposed on the outer surface) as shown in FIG. 2. Such voids 95 are generated almost inevitably as long as the powder is granulated powder. With a method for forming a part through additive manufacturing of the present invention, even when powder having voids 95 therein is used, voids generated in the resulting additively manufactured part can be reduced by performing a remelting step described below. The porosity of the composite powder is preferably less than or equal to 60% by volume, and with such porosity, the shape accuracy of the resulting additively manufactured part can be further enhanced. The porosity herein can be determined by, for example, measuring the real density and bulk density of the particles using a gas phase substitution method or a liquid phase substitution method, and determining the difference between the two values. Although the volume of the voids 95 is preferred to be small, it would be practically difficult to set the porosity to 0%, and the composite powder in accordance with the present invention has a porosity of greater than or equal to 1%. Therefore, the porosity of the composite powder in accordance with the present invention is preferably 1 to 60% by volume.

<Step of Performing Additive Manufacturing Through Melting and Solidification (S22)>

Next, additive manufacturing is performed by melting and solidifying the prepared composite powder so as to obtain an additively manufactured part (i.e., a composite material) (an additive manufacturing step). FIG. 5(b) is a schematic view of the additive manufacturing step. The additive manufacturing step includes a composite powder depositing step and a melted/solidified layer forming step. The composite powder depositing step includes spreading the prepared composite powder over a substrate 51 in FIG. 5(b), thereby forming a deposited layer of the composite powder. Next, in the melted/solidified layer forming step, the deposited layer is locally heated using a heat source 50 to form a micro melt pool of an alloy, and the heated area is moved within the plane of the deposited layer so that the micro melt pool is moved and sequentially solidified, and thus, a solidified layer 52 is built. Through the repetition of the two steps (i.e., the composite powder depositing step and the melted/solidified layer forming step) to form more than one solidified layer 52 in a stacked manner, an additively manufactured part (i.e., a composite material) of a composite alloy (containing ceramic and metal) with a desired shape and thickness can be obtained. Although a laser is selected as the heat source 50 in this embodiment, the heat source 50 need not necessarily be a laser, and even when an electron beam, arc, or plasma is used, similar additive manufacturing can be performed favorably. Further, although this embodiment selects powder bed fusion that involves the spreading of powder over a substrate in advance and the irradiation of the powder with a laser beam to heat the powder, the present invention is also applicable to direct metal deposition in which powder is directly blown to a heat source so that the powder melts on a substrate.

<Step of Remelting Surface of Additively Manufactured Part (S23)>

Figure 6:
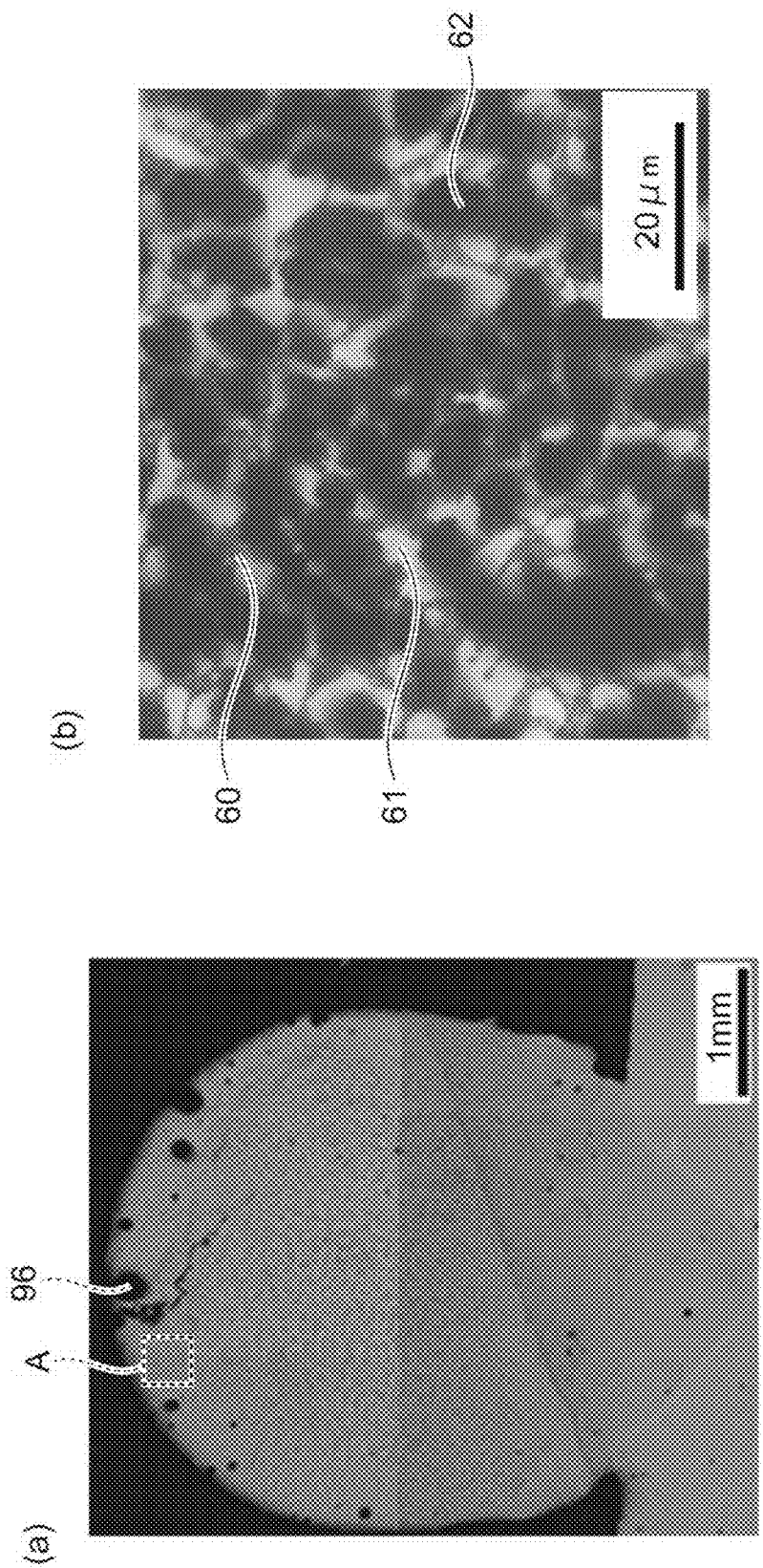
FIG. 6($a$) is a photograph of the cross-section of a composite material of a Comparative Example that has not undergone remelting, and FIG. 6(b) an enlarged photograph of an area A in the cross-sectional view of FIG. 6(a).
Figure 7:
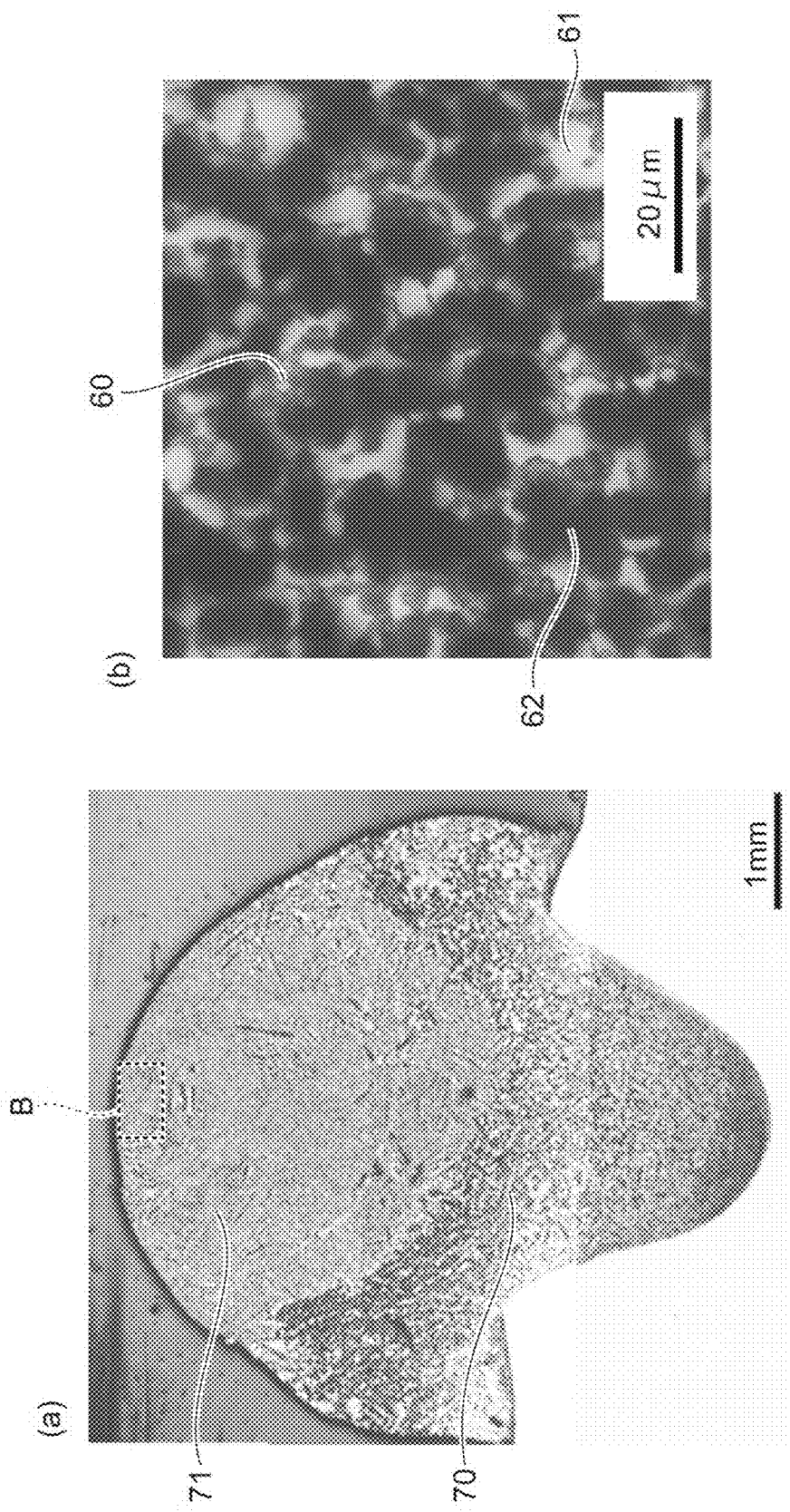
FIG. 7(a) is a photograph of the cross-section of the composite material of the present invention that has undergone remelting.
FIG. 7(b) is an enlarged photograph of an area B in the cross-sectional view of FIG. 7(a).

Next, the surface of the additively manufactured part built through the additive manufacturing step is remelted to obtain an additively manufactured part of the present invention (i.e., a remelting step). FIG. 5(c) shows a schematic view of the remelting step. The remelting step is a step of remelting a region around the surface (i.e., in the depth range of at least 100 μm from the surface) of the additively manufactured part 53 on the substrate 51 in FIG. 5(c) using the heat source 50, thereby allowing voids around the surface of the additively manufactured part to float up to the surface due to the buoyancy, and thus removing the voids. FIG. 6(a) shows a photograph of the cross-section of the additively manufactured part before the remelting step. As shown in FIG. 6(a), voids 96 are observed around the surface of the additively manufactured part. Since the composite powder in accordance with the present invention has voids therein, voids are also generated around the surface of the resulting additively manufactured part. However, performing the remelting step can significantly reduce voids generated around the surface of the additively manufactured part. FIG. 7(a) is a photograph of the cross-section of the additively manufactured part after the remelting step. In the cross-section of the additively manufactured part in FIG. 7(a) that has undergone remelting, voids are not observed around the surface unlike the additively manufactured part in FIG. 6(a) that has not undergone remelting. In addition, the additively manufactured part of the present invention is found to have a remelted region with high temperature strength formed around the surface thereof. This is considered to be due to the reason that the voids have floated up to the surface and thus disappeared by the remelting. Such remelting step is effective when applied to the outermost surface of the additively manufactured part, but may also be applied to each solidified layer forming the additively manufactured part. In order to reliably obtain the effect of removing voids from the additively manufactured part, a melt pool that is generated during remelting is preferably retained for a given duration, for example, 0.1 to 5 minutes. More preferably, the lower limit of the duration of staying of the melt pool is 0.5 minute. Setting the lower limit of the duration of staying of the melt pool to 0.5 minute can reduce the amount of an η phase that is a brittle phase as well as free carbon in the additively manufactured part after the remelting step. It should be noted that while solidified layers are repeatedly stacked, the amount of an η phase and free carbon can be slightly reduced by the heat affected from a melt pool existing in the previously stacked solidified layer. However, in order to significantly reduce the amount of the η phase and free carbon to adjust the structure of the resulting additively manufactured part and increase the strength thereof, it is considered to be effective to increase the duration of staying of a melt pool as described above. In order to increase the duration of staying of a melt pool, it is effective to suppress the amount of heat affected from the additively manufactured part. Therefore, for example, preheating may be performed before the additive manufacturing or the laser scan speed may be reduced. In addition, although this embodiment selects a laser that is similar to the laser used for the additive manufacturing as the heat source 50 for the remelting, the heat source 50 need not necessarily be a laser, and similar remelting can favorably occur even when an electron beam, arc, or plasma is used. It should be noted that the remelted region is preferably formed on the surface of a part of the additively manufactured part in which the strength is to be enhanced.

<Heat Treatment Step (S24)>

Figure 3:
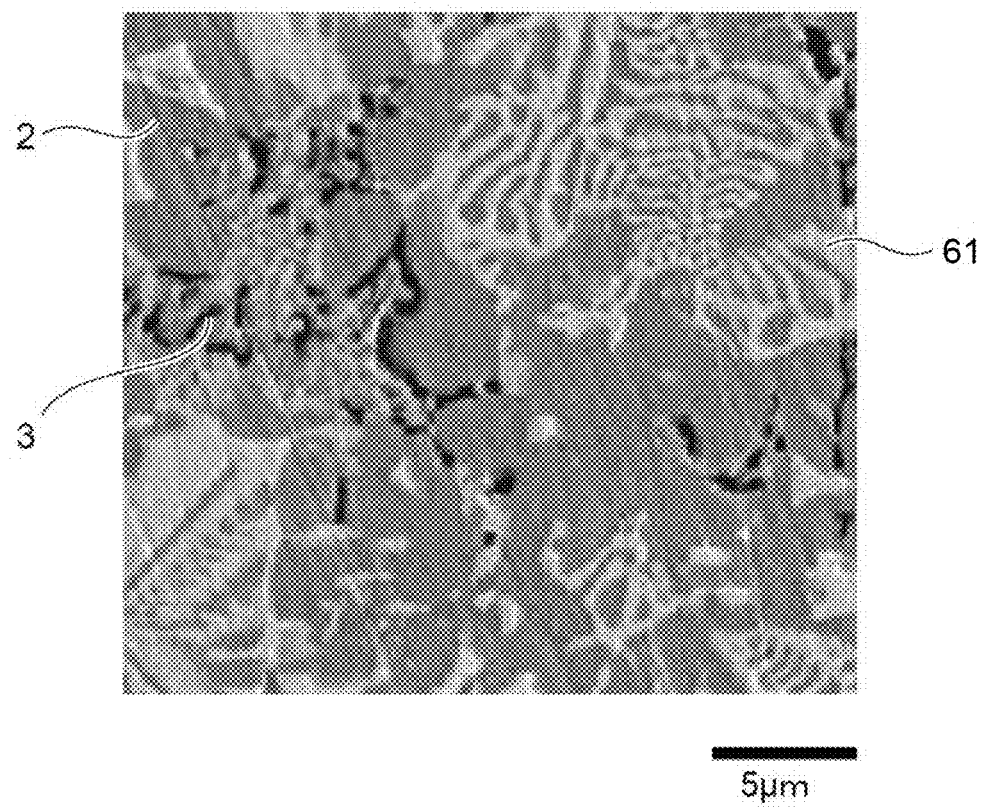
FIG. 3 is a photograph of the cross-sectional structure of a composite material formed by performing additive manufacturing on the composite powder in accordance with the present invention using a laser heat source.
Figure 4:
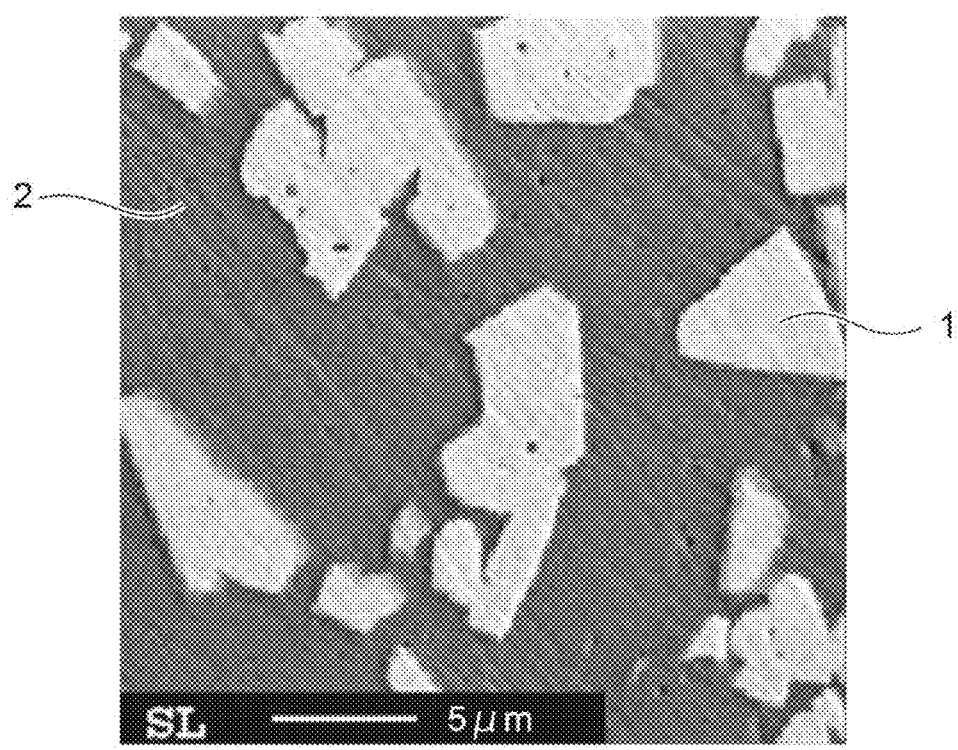
FIG. 4 is a photograph of the cross-sectional structure of the composite material of FIG. 3 that has undergone heat treatment at 1300° C.

In the manufacturing method of the present invention, a heat treatment step in the temperature range of greater than or equal to 800° C. and less than or equal to 1400° C. is preferably performed on the additively manufactured part that has been obtained through the aforementioned remelting step. More preferably, the lower limit of the temperature is set to 1000° C., and further preferably, 1200° C., and particularly preferably, 1300° C. When the temperature is less than or equal to 800° C., the diffusion speed of the atoms is slow. Therefore, a long time would be needed for the homogenization of the structure through rearrangement, and when the temperature is over 1400° C., if the material has a composition including a large amount of metal element, the metal will melt and it becomes difficult to maintain the shape of the manufactured part. Thus, such a temperature is not suitable. In addition, the staying time of the heat treatment temperature may be set to, for example, 10 minutes to 2 hours. The preferable staying time is from 20 minutes to 90 minutes. FIG. 3 is a SEM photograph showing the cross-sectional structure of the additively manufactured part after the remelting step (S23). It can be confirmed that the additively manufactured part includes, as shown in FIG. 3, a light-colored η phase 61, which is a brittle phase generated through reaction between the ceramic phase and metallic phase and showing dendrite, and a black isolated C phase 3, which results from the C (carbon or graphite) components of ceramic having been released alone around the dendrite, can be confirmed. Further, a ceramic phase is also included, though not shown in FIG. 3. In order to further increase the strength of the additively manufactured part, it would be effective to reduce the isolated C phase and η phase. In order to reduce or remove such an q phase of the dendrite structure or the isolated C phase, it would be effective to perform the heat treatment step (S24). Reducing or removing the η phase of the dendrite structure or the isolated C phase can further enhance the strength of the additively manufactured part. FIG. 4 is a SEM photograph showing an example of the cross-sectional structure of a sample obtained by performing heat treatment at 1300° C. on the additively manufactured part after performing remelting thereon. As shown in FIG. 4, the dendrite such as the η phase 61 shown in FIG. 3 has disappeared after the heat treatment and has become a polygonal ceramic phase 1. Further, it is also confirmed that the isolated C phase 3 in FIG. 3 has also disappeared. For the heat treatment, the existing equipment, such as a vacuum furnace or a pressure sintering furnace, can be used, for example. Herein, the pressure sintering furnace is preferably selected for the heat treatment because such a furnace is excellent in the effect of removing voids remaining in the manufactured part.

<Cutting Step (S25)>

In the manufacturing method of the present invention, a cutting step (S25) is preferably performed on the additively manufactured part after the heat treatment step (S24). Adding such a cutting step can further enhance the shape accuracy and surface accuracy of the additively manufactured part. As a tool applicable to the cutting work herein, the existing tools, such as a ball end milling tool, that can cut difficult-to-cut materials like cemented carbide can be used, for example. It should be noted that for the end milling tool, a diamond-coated cemented carbide tool, a cBN sintered tool, or a diamond sintered tool can be used.

<Composite Material (i.e., Additively Manufactured Part)>

The composite material (i.e., the additively manufactured part) of the present invention is an additively manufactured part including a ceramic phase and a metallic phase, and the additively manufactured part has a porosity of less than or equal to 10% in a part of its surface, specifically, in the thickness range of at least 100 µm from the surface. It should be noted that the composite material (i.e., the additively manufactured part) of this embodiment is a composite alloy body including a ceramic phase and a metallic phase, and having rapidly solidified structures of micro melt pools. Voids in the additively manufactured part tend to be generated around the surface thereof in a concentrated manner due to the introduction of carrier gas or shielding gas injected together with the heat of a heat source and due to the process in which voids of the composite powder float up during the melting and solidifying step. The additively manufactured part of the present invention can have reduced voids generated around the surface thereof in a concentrated manner because the surface has been remelted (hereinafter, a region that is melted again shall be referred to as a "remelted region"). Accordingly, the number of voids that become the origins of defects in the additively manufactured part becomes very small, and thus, the strength of the additively manufactured part can be increased. It should be noted that such a remelted region is formed in a region of the additively manufactured part in which the strength is to be enhanced. As a method for measuring the porosity in this embodiment, the porosity can be determined by, for example, observing the cross-section of a die using a scanning electron microscope (SEM) or the like and calculating the rate of areas occupied by the voids provided that the rate of the cross-sectional area of the composite material is assumed to be 100%.

The ceramic phase included in the additively manufactured part of the present invention preferably has an average grain size of less than or equal to 50 µm as such a grain size range can further enhance the strength and ductility of the additively manufactured part. Meanwhile, if the grain size is too small, it becomes difficult to manufacture the part. Therefore, the average grain size of the ceramic phase is preferably greater than or equal to 0.1 µm, for example. It should be noted that the average grain size of the ceramic phase in this embodiment can be determined by, for example, calculating the average size of a circle corresponding to the projected area of the ceramic phase in the range of 30 µm×30 µm from an observed image of SEM or the like.

As described above, the additively manufactured part in accordance with this embodiment has a metallic structure made up of an aggregate of rapidly solidified structures that have been formed through the rapid solidification of micro melt pools resulting from the additive manufacturing method. Specifically, the individual rapidly solidified structures each have an outer rim shape (or a substantially hemispherical contour derived therefrom) of the micro melt pool due to the local heating. In addition, the rapidly solidified structures are arranged two-dimensionally with their arcs aligned in the same direction, and thus forming a stratified solidified layer. Further, more than one such solidified layer are stacked in the thickness direction. Consequently, a metallic structure is obtained in which the rapidly solidified structures are arranged three-dimensionally. It should be noted that there may be cases where the melt boundaries are not observed clearly depending on the conditions of the additive manufacturing method.

When the rapidly solidified structures built through additive manufacturing are observed in more detail, it is found that columnar crystals and an η phase, extending across the melt boundaries have grown along the stacked direction (i.e., the thickness direction) of the solidified layers, and the columnar crystals are arranged with tilt grain boundaries therebetween. In addition, low-angle grain boundaries may occasionally be observed within the columnar crystals. In the present invention, a grain boundary whose inclination between adjacent grains (i.e., an inclination between predetermined adjacent crystal orientations) is greater than or equal to 15° is defined as a high-angle grain boundary, and a grain boundary whose inclination between adjacent grains is less than 15° is defined as a low-angle grain boundary. The inclinations of the grain boundaries can be measured through the analysis of an electron backscatter diffraction (EBSD) image.

To call a given structure a "rapidly solidified structure," the structure should have columnar crystals, such as an η phase, with an average grain size of at least less than or equal to 100 µm. From the perspective of the mechanical strength and corrosion resistance of a composite alloy, the average grain size of the columnar crystals is more preferably less than or equal to 50 µm, and further preferably less than or equal to 10 µm. It should be noted that the average grain size in the present invention is defined as an average value calculated from the short diameter and long diameter of a binarized grain value that has been obtained through the binarization of grain sizes read from an image observed with an optical microscope or electron microscope using image analysis software (i.e., an NIH Image, public domain software).

The proportion of the η phase in the additively manufactured part in accordance with this embodiment is preferably less than or equal to 10 mass %. Accordingly, as the additively manufactured part of this embodiment has generated therein a suppressed amount of an η phase that is a brittle phase, a further excellent strength property and the like can be obtained. Herein, the mass fraction (mass %) in this embodiment can be easily measured by performing substantial quantitative determination of an X-ray diffraction (XRD) measurement result using the reference intensity ratio (RIR). It should be noted that for the RIR value used in the RIR method of this embodiment, the value described in the ICDD card was used.

Although an additively manufactured part is built on a substrate in this embodiment, the present invention is not limited thereto, and it is also possible to form a part with a desired shape using an additive manufacturing method without the use of a substrate. Further, the present invention can be used not only for dies but also for heat-resistant materials of automobiles or aircrafts.

EXAMPLES

Hereinafter, the present invention will be described further specifically with reference to Examples and Comparative Example. It should be noted that the present invention is not limited to such Examples.

Example 1

First, changes in the rate of generation of voids in additively manufactured parts that depend on the remelting conditions were observed. WC—Co composite powder containing 45% by volume of a tungsten carbide (WC) phase and 55% by volume of a cobalt (Co) phase was prepared. The composite powder has voids 95 therein as shown in FIG. 2. The composite powder was loaded into a laser additive manufacturing equipment, and then, the powder was melted and solidified under the conditions shown in Table 1 so as to obtain three additively manufactured parts. Two of them were subjected to remelting under the conditions shown in No. 1 and No. 2 of Table 2, and the other one was not subjected to remelting (No. 11). It should be noted that the duration of staying of a melt pool in each of No. 1 and No. 2 was in the range of 0.5 to 1 minute. Each of the obtained samples was cut along its thickness direction, and the thus obtained cross-section was observed using an inverted metallographical microscope (produced by Olympus Corporation) so that the cross-section (in the range of 4 mm×4 mm) of the additively manufactured part was observed and the area rate of voids in the thickness range of 100 μm from the front surface was determined through image processing. In addition, the rupture strength and rupture ductility of the additively manufactured part were measured. Table 3 shows the measurement results.

The results in Table 3 can confirm that the sample of No. 1, which is an example of the present invention, does not have voids in the thickness range of 100 μm from the surface of the additively manufactured part, and thus has higher rupture strength and rupture ductility than those of the sample of No. 11, which is a Comparative Example not subjected to remelting, and thus, quite excellent results were obtained. The sample of No. 2 has a small number of voids, specifically, a porosity of 2.3% in the thickness range of 100 μm from the surface of the additively manufactured part because the laser output condition of the sample of No. 2 during remelting was lower than that of the sample of No. 1. However, the rupture strength and rupture ductility of the sample of No. 2 are found to be higher than those of the sample of No. 11 that is the Comparative Example, and thus, excellent results were obtained. From the results, it is found that introducing the remelting step can reduce the porosity and increase the rupture strength and rupture ductility of the additively manufactured part.

Example 2

The structure of the additively manufactured part before the remelting step, after the remelting step, and after the heat treatment step was observed. First, as the composite powder for additive manufacturing, WC—Co composite powder

TABLE 1

| Gas Used | Laser Output (W) | Powder Feed Rate (g/cm) | Scan Speed (mm/min) | Defocus Distance Df (mm) | Carrier Gas Flow Rate (L/min) | Shielding Gas Flow Rate (L/min) | Order of Manufacturing (Number of Passes + Time Interval between Passes × Number of Repetitions (Number of Stacked Layers) | Amount of Heat Input (kJ/cm) | Amount of Heat Input per Powder (kJ/g) |
|---|---|---|---|---|---|---|---|---|---|
| Ar | 1200 | 0.2 | 100 | 18 | 20 | 15 | 8 Passes + 2 Minutes × 3 Times (24 Layers) | 7.2 | 36 |

TABLE 2

| No. | Gas Used | Laser Output (W) | Scan Speed (mm/min) | Defocus Distance Df (mm) | Carrier Gas Flow Rate (L/min) | Shielding Gas Flow Rate (L/min) | Number of Remelting Passes | Amount of Heat Input (kJ/cm) |
|---|---|---|---|---|---|---|---|---|
| 1 | Ar | 1200 | 100 | 48 | 20 | 15 | 2 Passes | 7.2 |
| 2 | Ar | 800 | 100 | 24 | 20 | 15 | 2 Passes | 7.2 |
| 11 | | | | Without Remelting | | | | |

TABLE 3

| No. | Porosity within Manufactured Part [%] | Rupture Strength of Manufactured Part [MPa] | Rapture Ductility of Manufactured Part [%] |
|---|---|---|---|
| 1 | 0 | 1580 | 4.1 |
| 2 | 2.3 | 1487 | 2.1 |
| 11 | 12.9 | 1210 | 1.9 | containing 45 vol % of tungsten carbide (WC) and 55 vol % of cobalt (Co) was prepared. Then, the prepared powder was loaded into a laser additive manufacturing equipment, and was then melted and solidified under the conditions shown in Table 4 so as to obtain an additively manufactured part. FIG. 6(*a*) shows a photograph of the cross-section of the obtained additively manufactured part, and FIG. 6(*b*) shows an enlarged photograph of a area A in FIG. 6(*a*). As shown in FIG. 6(*a*), voids 96 are observed around the surface of the additively manufactured part.

TABLE 4

| Gas Used | Laser Output (W) | Powder Feed Rate (g/cm) | Scan Speed (mm/min) | Defocus Distance Df (mm) | Carrier Gas Flow Rate (L/min) | Shielding Gas Flow Rate (L/min) | Order of Manufacturing (Number of Passes + Time Interval between Passes × Number of Repetitions (Number of Stacked Layers) | Amount of Heat Input (kJ/cm) | Amount of Heat Input per Powder (kJ/g) |
|---|---|---|---|---|---|---|---|---|---|
| Ar | 1000 | 0.4 | 200 | 18 | 10 | 15 | 4 Passes + 2 Minutes × 5 Times (20 Layers) | 3 | 7.5 |

Next, the additively manufactured part shown in FIG. 6(a) was subjected to remelting under the same conditions as those for the sample No. 1 in Table 2 of Example 1. FIG. 7(a) is a photograph of the cross-section of the additively manufactured part after the remelting step, and FIG. 7(b) shows an enlarged photograph of a area B in FIG. 7(a). It is found that from the cross-section of the additively manufactured part in FIG. 7(a) subjected to remelting, no voids are observed around the surface, and thus, a remelted region with high temperature strength is formed. Meanwhile, as shown in FIG. 6(b) and FIG. 7(b), it is found that regardless of whether remelting was performed or not, the surface structure of the additively manufactured part has generated therein an isolated C phase 60 of the C (carbon or graphite) components released alone from the ceramic particles, an η phase 61 generated through reaction between the ceramic phase and the metallic phase, and the metallic phase 62.

Figure 11:
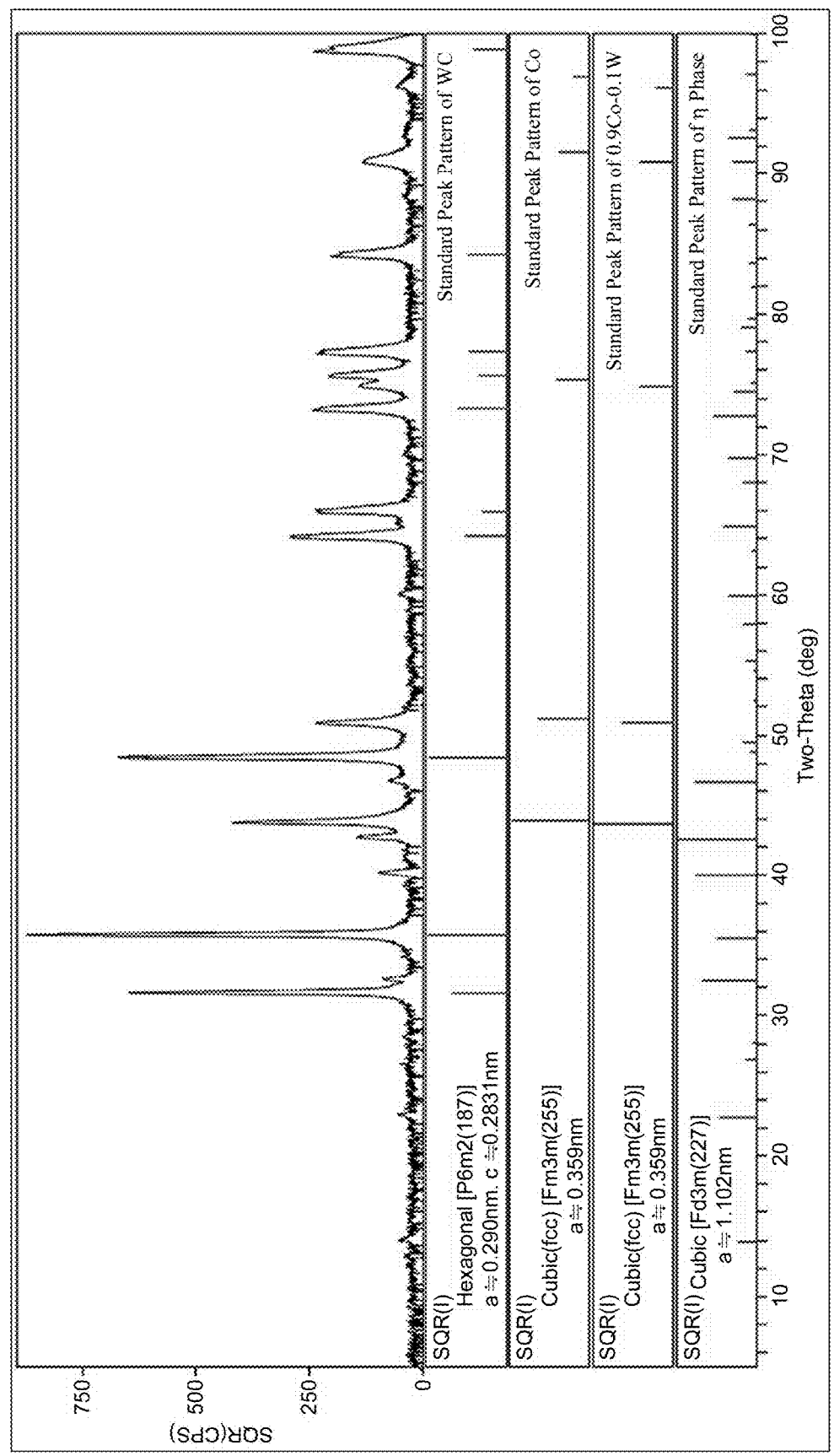
FIG. 11 shows the results of performing X-ray diffraction (XRD) measurement on the composite material of the present invention.

XRD measurement was performed on the additively manufactured part that has undergone the aforementioned remelting step shown in FIG. 7(a), using a micro area X-ray diffractometer (product name: SmartLab) produced by Rigaku Corporation. The measuring conditions set were: an X-ray source: Cu, the X-ray output: 45 kV/200 mA, the scan range: $5 \leq 2\theta \leq 100$ deg, and the scan speed: 1.0 deg/min. From the obtained results, the mass fraction of each phase included in the sample was simply determined through substantial quantitative determination using the RIR method. FIG. 11 shows the XRD measurement results, and Table 5 shows the determined mass fraction. The results in Table 5 can confirm that the additively manufactured part of this embodiment contains 5.9% by mass of an η phase. It should be noted that the standard peak pattern of each phase was obtained from the ICDD card.

TABLE 5

| (mass %) | | | |
|---|---|---|---|
| WC | Co | Co3W3C (η Phase) | Total |
| 60.9 | 33.2 | 5.9 | 100.0 |

In order to further reduce the remaining isolated C phase 60 and η phase 61, heat treatment was applied to the additively manufactured part shown in FIG. 7(a), and then, the cross-sectional structure thereof was observed. FIG. 4 is a photograph of the cross-section of the additively manufactured part subjected to heat treatment at 1300° C. for 1 hour using a vacuum heat treatment equipment. From FIG. 4, it is found that the additively manufactured part after the heat treatment does not have the isolated C phase 60 or η phase 61 any more unlike those shown in FIGS. 6(b) and 7(b), and thus that a structure with even higher hardness was obtained.

Figure 8:
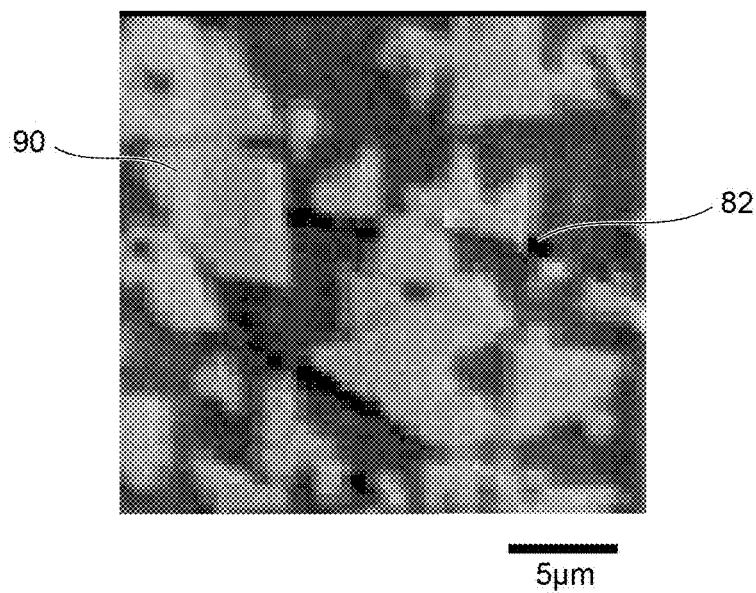
FIG. 8 is a photograph of the cross-sectional structure of the composite material of the present invention that has undergone heat treatment at 800° C. after a remelting step.
Figure 9:
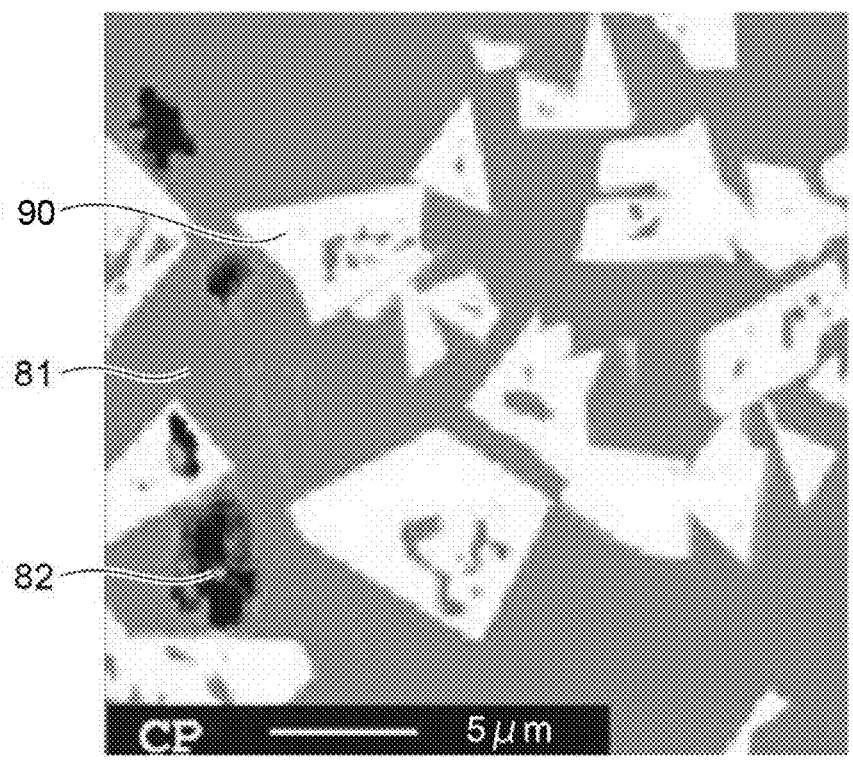
FIG. 9 is a photograph of the cross-sectional structure of the composite material of the present invention that has undergone heat treatment at 1200° C. after a remelting step.
Figure 10:
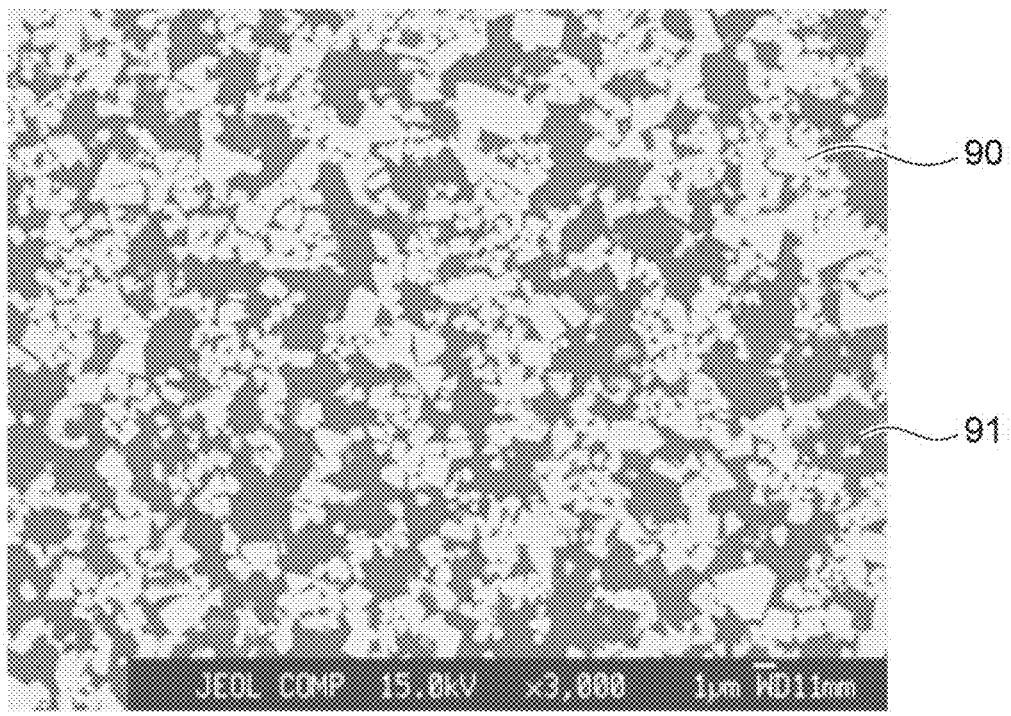
FIG. 10 is a photograph of the cross-sectional structure of the composite material of the present invention that has undergone heat treatment at 1300° C. after a remelting step.

Next, after the conditions in Table 4 were selected, remelting was performed under the same conditions as those for the sample No. 1 in Table 2 of Example 1, and then, heat treatment was performed at 800° C., 1200° C., and 1300° C. for 0.5 hour. The respective obtained structures are shown in FIGS. 8, 9, and 10. Although a ceramic phase of a dendrite structure was not observed in each of FIGS. 8, 9, and 10, an η phase 80 and an isolated C phase 82 were confirmed in the respective structures subjected to the heat treatment at 800° C. and 1200° C. Thus, it is assumed that such temperatures did not allow sufficient transformation to take place. Meanwhile, it was confirmed that when the heat treatment at 1300° C. was performed, a two-phase structure including only a WC phase 90 and a metallic phase 91 was obtained. When the heat treatment is performed at 1300° C., the isolated C phase and the η phase can be removed in a shorter time than when the heat treatment is performed at 1200° C. Therefore, the heat treatment is preferably performed at 1300° C. Further, when XRD measurement was performed on the sample subjected to the heat treatment at 1300° C., a peak corresponding to the η phase was not observed, either.

Although the embodiments of the present invention have been described in detail above, the present invention is not limited thereto, and various design changes can be made within the spirit and scope of the present invention recited in the appended claims. For example, although the aforementioned embodiments have been described in detail to clearly illustrate the present invention, the present invention need not include all of the configurations described in the embodiments. It is possible to replace a part of a configuration of an embodiment with a configuration of another embodiment. In addition, it is also possible to add, to a configuration of an embodiment, a configuration of another embodiment. Further, it is also possible to, for a part of a configuration of each embodiment, add/remove/substitute a configuration of another embodiment.

REFERENCE SIGNS LIST

1 Ceramic phase
2, 62 Metallic phase
3, 60, 82 Free C (carbon) phase
40 Composite powder
50 Heat source
51 Substrate
52 Solidified layer
53 composite material
61 η phase
70 Non-remelted region
71 Remelted region
90 WC phase
81, 91 Co phase
95 Void in powder
96 Void in composite material

The invention claimed is:

1. A composite material manufacturing method comprising:
- an additive manufacturing step of using composite powder containing a ceramic and a metal and having voids therein to form a material containing the ceramic and the metal by repeating steps of spreading the composite powder over a substrate and then melting and solidifying the composite powder and forming solidified layers in a stacked manner;
- a remelting step of remelting a surface of the material; and
- applying a heat treatment to the material in a temperature range of 800 to 1400° C. after the remelting for a period of between 10 minutes and 2 hours to form the composite material;
- wherein the composite material comprises 40 to 70% by volume of the ceramic and 30 to 60% by volume of the metal and a total volume of the ceramic and the metal is 100%; and
- wherein in the remelting step, a melt pool generated during remelting is retained for a duration of 0.5 to 5 minutes.

2. The composite material manufacturing method according to claim 1, wherein
- the ceramic is tungsten carbide, and
- the metal is cobalt.

3. A composite material comprising;
- a ceramic phase; and
- a metallic phase,
- wherein a porosity of a region of the composite material in a thickness range of at least 100 μm from a surface of the composite material is less than or equal to 10%,
- wherein a mass fraction of an η phase included in the composite material is less than or equal to 10% and
- wherein the composite material is an additively manufactured part having rapidly solidified structures and is formed by repeated steps of spreading a composite powder over a substrate and then melting and solidifying the composite powder, wherein the composite powder includes a ceramic and metal,
- forming solidified layers in a stacked manner, and
- a remelting step, wherein a melt pool generated during remelting is retained for a duration of 0.5 to 5 minutes, and
- wherein the composite material comprises 40 to 70% by volume of the ceramic and 30 to 60% by volume of the metal and a total volume of the ceramic and the metal is 100%,
- wherein the mass fraction of an η phase is achieved by reducing an η phase of a dendrite structure in the composite material by applying a heat treatment for a period between 10 minutes and 2 hours in a temperature range of 800 to 1400° C. after the forming of the solidified layers in the stacked manner.

4. The composite material according to claim 3, wherein the ceramic phase is tungsten carbide, and the metallic phase is cobalt.

5. The composite material manufacturing method according to claim 1, wherein the heat treatment is between a temperature range of 1200° C. and 1400° C.

6. The composite material manufacturing method according to claim 5, wherein the heat treatment is performed for a period of between 20 minutes and 90 minutes.

7. The composite material according to claim 3, the heat treatment is between a temperature range of 1200° C. and 1400° C.

8. The composite material according to claim 7, wherein the heat treatment is performed for a period of between 20 minutes and 90 minutes.

9. The composite material manufacturing method according to claim 1, wherein the additive manufacturing step is powder bed fusion or direct metal deposition.

* * * * *